Nov. 20, 1951     J. E. HALL     2,575,624
PIPE LINE SWAB WITH EXPANSIBLE ELEMENT
Filed Jan. 10, 1947
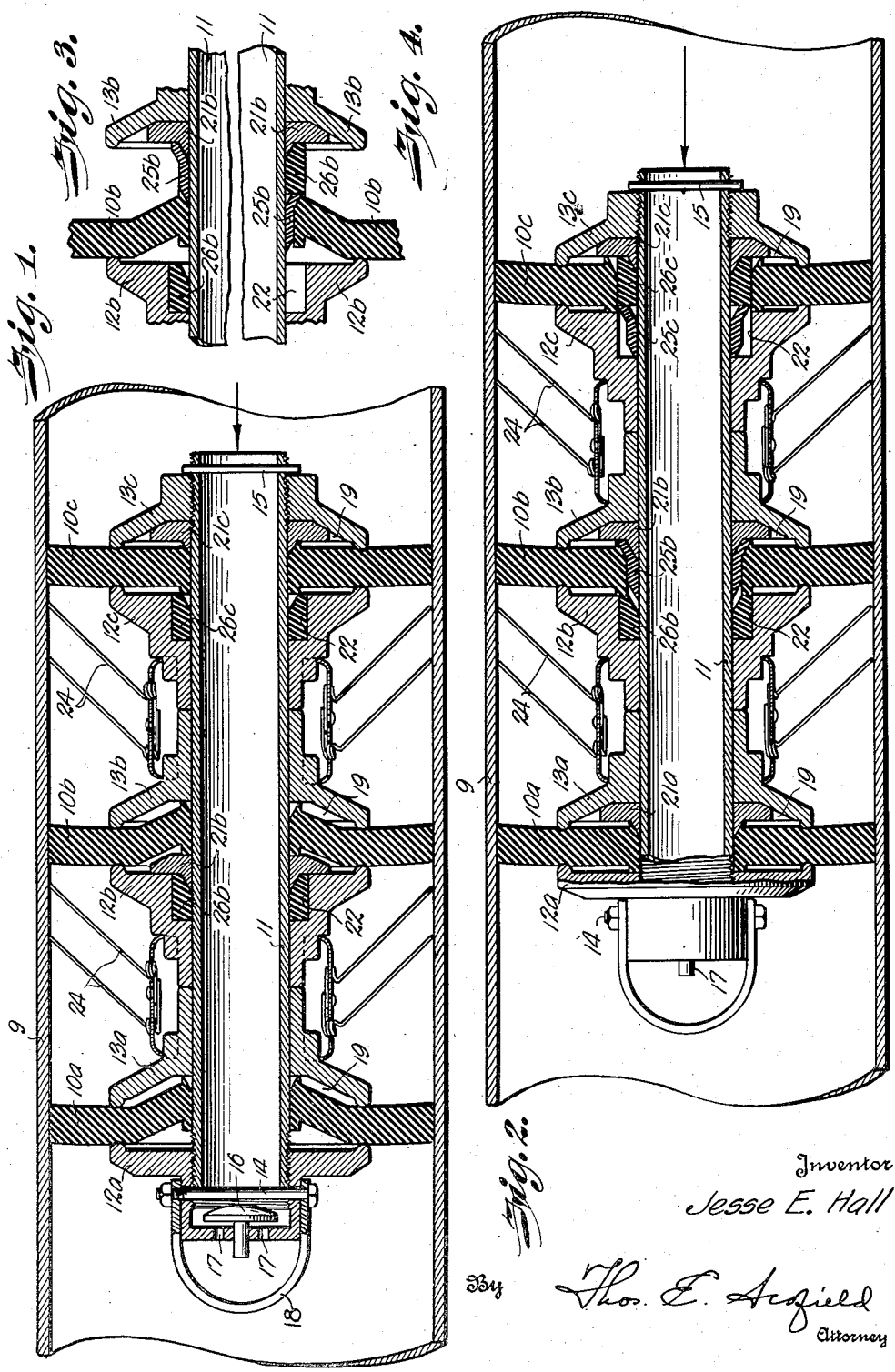
Inventor
Jesse E. Hall Patented Nov. 20, 1951

2,575,624

UNITED STATES PATENT OFFICE 2,575,624

PIPE-LINE SWAB WITH EXPANSIBLE ELEMENT

Jesse E. Hall, Weatherford, Tex., assignor of ninety per cent to Nevada Leasehold Corporation, a corporation of Nevada, and ten per cent to Parker Industrial Products, Inc., a corporation of Texas Application January 10, 1947, Serial No. 721,283

6 Claims. (Cl. 15—104.06)

The present invention relates in general to pipe line cleaners, commonly called swabs or go-devils, and it is an improvement over the device disclosed in my previous application, Serial No. 489,046, filed May 29, 1943, which issued January 1, 1946, as Patent No. 2,392,144.

Pipe line cleaners are usually made up of a plurality of spaced flexible rubber disks mounted on an elongated central body. The disks have a pressure-tight fit with the interior surface of the pipe so that fluid pressure in the line behind the cleaner propels it through the line. Swabs of this character ordinarily are employed to clean accumulated deposits such as sand, wax, rust and encrustations from the line. It is also conventional however to insert a swab in the line between different grades or types of fluids passing therethrough to prevent intermingling.

As the swab travels through the pipe line the outer margins of the rubber disks are abraded rapidly, and in the past it has been necessary to replace the disks frequently in order to keep the device functioning properly.

An important object of the present invention is to provide a construction which materially increases the useful life of the individual disks and hence reduces the frequency with which they must be replaced. In order to achieve this end, arrangements are made for expanding the disks radially as their margins become worn.

A feature of the invention resides in the provision of disks having a dished or concavo-convex center portion together with apparatus for flattening the center portion to expand the disks radially.

Another feature resides in the provision of a novel construction whereby the disk may be expanded very easily a plurality of times to provide successive stages of enlargement.

Other objects and features will appear in the course of the following description of the invention.

In the drawing which forms a part of the specification and wherein like numerals are employed to designate like parts of the various views, Fig. 1 is a longitudinal cross section of a pipe line swab embodying my invention, Fig. 2 is another longitudinal cross section of the swab, showing the disks expanded, and Figs. 3 and 4 are fragmentary longitudinal sections illustrating details of the device.

Referring more particularly to the drawings the numeral 9 indicates a pipe line through which the swab is adapted to move in the direction shown by the arrows, propelled by fluid under pressure advancing behind it. Essentially the swab comprises a series of rubber disks 10a, 10b, and 10c held in fixed spaced relation on a tubular body 11 by means of radially flanged collars 12a, 12b and 12c disposed forwardly of the respective disks and corresponding collars 13a, 13b and 13c disposed rearwardly of the disks. The foremost collar 12a and the rearmost collar 13c are screwed on opposite ends of the tube 11 and serve to clamp the intermediate collars and disks tightly together; they are prevented from unscrewing by means of a bolt 14 and a cotter pin 15, both of which extend diametrically across the tube, the former fitting into notches or slots in the forward end of the tube and the latter fitting into holes at the rear end.

The foremost collar 12a covers the front end of the tube 11 and has slidably mounted therein the stem of a valve 16. The rear end of the tube is open. Accordingly when pressure in the line behind the swab exceeds the pressure in front of it, as is normally the case, valve 16 automatically slides forward to close ports 17. On the other hand, when pressure behind the device is less than that in front of it the valve 16 slides back against bolt 14 to open the ports; this prevents the creation of a vacuum behind the swab when it is pulled forward by bail 18 in the course of removing the device from the pipe line, and thus facilitates such removal.

The swab is sufficiently long to bridge the largest opening in the wall of pipe 9 which it may be expected to encounter in passing through the line. Although illustrated as having three rubber disks it obviously may be provided with a greater or lesser number if desired. It is preferred, however, that there be at least three disks because this prevents canting of the device in the line and consequent loss of contact between the peripheries of the disks and the interior of the pipe.

As molded, all of the rubber disks are of identical size and have a dished or concavo-convex center section as illustrated by 10a and 10b in Fig. 1. To accommodate this dished center section the supporting collars 13a, 13b and 13c disposed rearwardly of the disks are provided with tapered cavities 19. Sometimes it is desired to flatten the center portion of one or more of the disks, as will be explained more fully hereinafter, and this is accomplished by inserting filler rings 21a, 21b or 21c in appropriate ones of the cavities 19. The disk-supporting collars 13b and 13c disposed forwardly of the last two disks are provided with annular recesses 22 for a purpose presently to be described.

The flange on each supporting collar is provided with an annular bead adjacent the margin thereof, which bead engages the disk and forms therewith a flow chamber adapted to receive the material of the disk when same is compressed in negotiating a curve or the like, all as explained in my prior case. Around the central aperture in each rubber disk is an annular flange whose thickness conforms with the thickness of this bead.

When the swab is initially put into service the leading disk 10a and the middle disk 10b are mounted on tube 11 in the manner illustrated while the trailing disk 10c is mounted in the same fashion as the middle one, i. e., with the ring 21c positioned forwardly of the disk rather than in cavity 19. Thus the center portion of all three disks will be concavo-convex. The outside diameter of each disk is slightly larger than the inside diameter of the pipe and accordingly when the swab is inserted in the pipe the disks flex rearwardly as shown. Then when fluid under pressure is admitted to the pipe behind the swab it forces valve 16 shut and propels the swab through the line. In practice, the device usually is sent from one pumping station to another although it may be sent any desired distance.

As the swab travels through the pipe the wire whiskers 24 press against the inner surface of the pipe with sufficient force to effectively remove encrustations, and at the same time they cause the swab to rotate about its longitudinal axis as explained in my prior application so that the disks wear evenly around their entire peripheries. The margin of the leading disk however is abraded more than that of the second disk, and the second disk in turn wears faster than the third.

When disk 10a has worn to such an extent that it no longer presses against the interior of the pipe with the requisite pressure the filler ring 21a may be inserted behind it as shown in Fig. 2. This, by straightening or flattening the dished center portion, forces the material of the disk radially outward, increasing the pressure exerted by the disk on the walls of the pipe and permitting the disk to be used further.

In the same way disk 10b may be expanded when worn by shifting the ring 21b from its position in front of the disk to a position behind the disk, the arrangement of parts then being like that illustrated for disk 10c in Fig. 1. Assuming that disk 10b has been enlarged in this fashion and through subsequent use of the swab has been worn down again, it can be expanded still further by insertion of an annular bushing or shim 25b between the disk and tube 11, as shown in Fig. 2. This is accomplished by assembling the parts in the relationship shown in Fig. 3 and then screwing the two end collars of the swab home so that collar 13b is advanced toward collar 12b. Due to the internal taper in the hub of the rubber disk and the matching external taper of the bushing or shim the latter is forced under the disk as it advances bringing it finally to the position illustrated in Fig. 2. This obviously expands the disk making it suitable for further use.

A third expansion may be effected after the swab has seen additional service in order to prolong the usefulness of the disk still further. In order to do this the swab is disassembled (the annular bushing 25b remaining in the central hole in the disk 10b, however). Ring 26b is removed from recess 22 in collar 12b and the parts are reassembled as shown in Fig. 4. Now when the collar 13b is advanced toward collar 12b as a result of the two end collars of the hub being tightened down ring 26b drives the bushing 25b on through the disk into recess 22, and itself takes a position between the disk and tube 11, the final relationship of parts being as shown in connection with disk 10c in Fig. 2.

Thus it will be seen that the middle disk is capable of having four different sizes depending upon how it and the associated parts are assembled. Listed in order of increasing size, the four stages are:

Stage 1—illustrated by disk 10b, Fig. 1
Stage 2—illustrated by disk 10c, Fig. 1
Stage 3—illustrated by disk 10b, Fig. 2
Stage 4—illustrated by disk 10c, Fig. 2

Though the description has dealt mainly with the middle disk it will be understood that the trailing disk is capable of having any one of the same four sizes as the middle disk; the leading disk on the other hand may have only two sizes as illustrated by 10a in Figs. 1 and 2 respectively.

In practice because of the greater wear on the leading disk it usually is found best to move it, when worn, first to the middle position on the swab and finally, after additional use, to the trailing position. In other words, new disks usually are installed in the leading position on the swab then moved rearwardly with such expansion from time to time as is necessary to maintain adequate contact with the walls of the pipe line, the disks finally being discarded from the trailing position when they no longer can be used. However, since the individual disks are freely interchangeable so far as their position on the swab is concerned and since they may have different sizes in any position it is not intended to limit the invention to any particular sequence of steps in locating and enlarging the disks.

Referring again briefly to the shape and condition of disk 10b in Fig. 1, it is obvious that rings 21b and 26b can be omitted from the assembly at this stage if desired, but it is preferred to position them as shown in order to store them conveniently so they will be available when needed. Not only does this guard against loss of the rings but it also serves to give additional support to the central flange or hub of the rubber disk 10b. Referring to stage 2, as illustrated by disk 10c of Fig. 1, the ring 26c may be inserted in recess 22 as shown or, alternatively, with the tapered end of its bore toward the base of the recess in order to have the flat side of the ring adjacent the central flange or hub of disk 10c; in either event recess 22 serves in this stage, as well as in stage 3 (illustrated by disk 10b of Fig. 2) as a storage place for the ring 26.

The rings and annular bushings which are employed as described above to deform the disks for purposes of expanding the same may be of any suitable rigid material such as metal, molded resinous material or hard rubber, the latter being preferred.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments of the invention may be made without departing from the scope thereof it is to be understood that all matter herein set forth or shown in the accompanying drawings is to be interpreted as illustrative and not in a limiting sense.

Having thus described my invention, I claim:

1. In a pipe line swab, an elongated body, a centrally apertured flexible disk encircling the body, said disk in its normal, unstressed state having a concavo-convex center portion, and flanged collars on opposite sides of the disk engaging same outside of said concavo-convex portion thereby to support the disk, the flanges on the respective collars being of equal diameter whereby they engage the disk equidistant from said body.

2. In a pipe line swab, an elongated body, a centrally apertured flexible disk encircling the body, said disk in its normal, unstressed state having a concavo-convex center portion, and means for flattening said center portion of the disk to force the material of the disk radially outward.

3. In a pipe line swab, an elongated body, a centrally apertured flexible disk encircling the body, said disk having a concavo-convex center portion, flanged collars on opposite sides of the disk engaging same outside of said concavo-convex portion thereby to support the disk, one of said flanged collars having a cavity for receiving the convex side of the disk, and a filler ring adapted at times to be placed in said cavity to flatten the center portion of the disk.

4. In a pipe line swab, an elongated body, a centrally apertured flexible disk encircling the body, said disk having a concavo convex center portion, flanged collars on opposite sides of the disk engaging same outside of the concavo convex portion thereby to support the disk, one of said flanged collars having a cavity for receiving the convex side of the disk, and an annular wedge movable axially of said elongated body between said body and the disk to force the material of said disk radially outward, and a filler ring adapted to be placed in said cavity to flatten the center portion the disk.

5. In a pipe line swab, an elongated body, centrally apertured flexible disks encircling the body at spaced apart points thereon, flanged collars on opposite sides of each disk to support same, an annular wedge encircling said elongated body, an annular bushing also encircling said body and having an outside diameter exceeding the normal size of the aperture in one of said disks, said bushing being adapted to be moved axially of said elongated body toward said one disk and to drive said wedge before it, said wedge being effective upon such movement to spread the aperture in said one disk to admit said bushing whereafter said bushing maintains the disk displaced radially outward, and a pocket in one of the collars confronting said disk for receiving the wedge as it emerges from the aperture in the disk.

6. In a pipe line swab, an elongated body, a centrally apertured flexible disk encircling said body, said disk in its normal, unstressed state having a concavo convex center portion, an annular wedge encircling said body, and means for advancing said wedge axially of the body and into the aperture of said disk and at the same time flattening said center portion of the disk to force the material of the disk radially outward.

JESSE E. HALL.

REFERENCES CITED

The following references are of record in the file of this patent:

UNITED STATES PATENTS

| Number | Name | Date |
|---|---|---|
| 625,155 | Dresser | May 16, 1899 |
| 1,713,895 | Ford | May 21, 1929 |
| 1,732,277 | Owens | Oct. 22, 1929 |
| 2,222,082 | Leman et al. | Nov. 19, 1940 |
| 2,272,650 | Von Veh | Feb. 10, 1942 |
| 2,392,144 | Hall | Jan. 1, 1946 |
| 2,427,632 | Stephens | Sept. 16, 1947 |